(12) United States Patent
Shin et al.

(10) Patent No.: US 8,117,632 B2
(45) Date of Patent: Feb. 14, 2012

(54) CHUCK PIN AND DISK CHUCKING DEVICE HAVING THE SAME

(75) Inventors: Kyung-Seob Shin, Suwon-si (KR); Yeol Choi, Gwangmyeong-si (KR); Pyo Kim, Suwon-si (KR); Young-Sun Yoo, Suwon-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 278 days.

(21) Appl. No.: 12/502,689

(22) Filed: Jul. 14, 2009

(65) Prior Publication Data

US 2010/0146526 A1   Jun. 10, 2010

(30) Foreign Application Priority Data

Dec. 10, 2008  (KR) ........................ 10-2008-0125071

(51) Int. Cl.
*G11B 17/02* (2006.01)
(52) U.S. Cl. ...................................................... 720/709
(58) Field of Classification Search .................. 720/709, 720/622, 713, 704, 619, 715, 655, 610, 690, 720/624, 652, 707, 604, 702, 696, 712
See application file for complete search history.

(56) References Cited

U.S. PATENT DOCUMENTS

| | | | | |
|---|---|---|---|---|
| 7,216,355 B2* | 5/2007 | Kim et al. | | 720/706 |
| 7,313,801 B2* | 12/2007 | Choi et al. | | 720/709 |
| 7,343,610 B2* | 3/2008 | Shibata | | 720/713 |
| 7,478,412 B2* | 1/2009 | Huh et al. | | 720/706 |
| 7,802,273 B2* | 9/2010 | Kim et al. | | 720/709 |
| 7,900,223 B2* | 3/2011 | Takaki et al. | | 720/707 |
| 2004/0244024 A1* | 12/2004 | Horng et al. | | 720/706 |
| 2004/0244025 A1* | 12/2004 | Horng et al. | | 720/706 |
| 2006/0031866 A1* | 2/2006 | Kim et al. | | 720/706 |
| 2007/0199010 A1* | 8/2007 | Chen | | 720/706 |
| 2010/0242058 A1* | 9/2010 | Yoon | | 720/706 |

FOREIGN PATENT DOCUMENTS

| | | |
|---|---|---|
| JP | 2006-127768 A | 6/2006 |
| JP | 2008-234735 A | 10/2008 |
| KR | 10-2008-0085719 | 9/2008 |

OTHER PUBLICATIONS

Korean Office Action, w/ partial English translation thereof, issued in Korean Patent Application No. KR 10-2008-0125071 dated Mar. 29, 2010.

Japanese Office Action, with partial English translation, issued in Japanese Patent Application No. 2009-168881, dated Oct. 4, 2011.

* cited by examiner

*Primary Examiner* — Allen Cao
(74) *Attorney, Agent, or Firm* — McDermott Will & Emery LLP

(57) ABSTRACT

A chuck pin and a disk chucking device equipped with the chuck pin are disclosed. In accordance with an embodiment of the present invention, the chuck pin fastening a disk by compressing an inner circumference of the disk includes a protruding part, which presses against the disk, and a body, in which a front part of the body is coupled to the protruding part and an inclined part is formed on a lower surface of the body such that the front part of the body can be rotated about a back part of the body as a pivot when pressure is applied to an upper surface of the protruding part. With this configuration, the chuck pin is kept from floating when the disk rotates, and the chuck pin can be easily tilted downward when the disk is loaded.

6 Claims, 5 Drawing Sheets

CHUCK PIN AND DISK CHUCKING DEVICE HAVING THE SAME

CROSS-REFERENCE TO RELATED APPLICATIONS

This application claims the benefit of Korean Patent Application No. 10-2008-0125071, filed with the Korean Intellectual Property Office on Dec. 10, 2008, the disclosure of which is incorporated herein by reference in its entirety.

BACKGROUND

1. Technical Field

The present invention relates to a chuck pin and a disk chucking device equipped with the chuck pin.

2. Description of the Related Art

Generally, a disk driving device includes a disk chucking device for loading or unloading a disk.

FIG. 1 is a cross-sectional view illustrating a disk chucking device in accordance with the related art. In a conventional design of a disk chucking device, a housing is inserted in an inner circumference of a disk, and a chuck pin is protruded from the housing. In addition, a spring is interposed between the chuck pin and a boss of the housing such that the chuck pin can be reciprocated and press the inner circumference of the disk.

When loading a disk in such disk chucking device, pressure is applied to an upper surface of the chuck pin. Accordingly, the chuck pin is tilted downward and receded to allow the disk to be mounted. Here, in order to allow the chuck pin to tilt downward and recede, a gap is formed between the chuck pin and a supporting surface or the housing.

However, the gap may cause the chuck pin to be lifted while the disk is rotating. As the disk rotates in a circular motion, flotage may be created in the disk and lift the chuck pin, due to the gap between the chuck pin and the supporting surface or the housing. As a result, some of the holding force of the disk chucking device for holding the disk is lost, and thus the disk may be separated from the disk chucking device.

SUMMARY

The present invention provides a chuck pin and a disk chucking device equipped with the chuck pin that can prevent the chuck pin from floating.

An aspect of the present invention provides a chuck pin. In accordance with an embodiment of the present invention, the chuck pin fastening a disk by compressing an inner circumference of the disk includes a protruding part, which presses against the disk, and a body, in which a front part of the body is coupled to the protruding part and an inclined part is formed on a lower surface of the body such that the front part of the body can be rotated about a back part of the body as a pivot when pressure is applied to an upper surface of the protruding part.

Here, the inclined part can be formed to incline downward from the front part to the back part of the body.

The inclined part can also include a curved surface.

Another aspect of the present invention provides a disk chucking device. In accordance with an embodiment of the present invention, the disk chucking device, which couples a disk to a rotor of a motor such that the disk can be mounted and demounted, includes a housing, which accommodate a boss being coupled with the rotor, a chuck pin, which is inserted into the housing such that the chuck pin is protruded from the housing, and an elastic body, which is interposed between the chuck pin and the boss of the housing such that the chuck pin is elastically supported toward the outside of the housing. Here, the chuck pin includes a protruding part, which is pressed against the disk, and a body, of which a front part is coupled to the protruding part and of which a lower surface has an inclined part formed such that the front part of the body can be rotated about the back part of the body as a pivot when pressure is applied to an upper surface of the protruding part.

The inclined part can be formed to incline downward from the front part to the back part of the body.

A guide part can be formed in the housing to guide a movement of the chuck pin, and a height of the guide part can be formed in accordance with the thickness of the back part of the body.

Additional aspects and advantages of the present invention will be set forth in part in the description which follows, and in part will be obvious from the description, or may be learned by practice of the invention.

DETAILED DESCRIPTION

Figure 1:
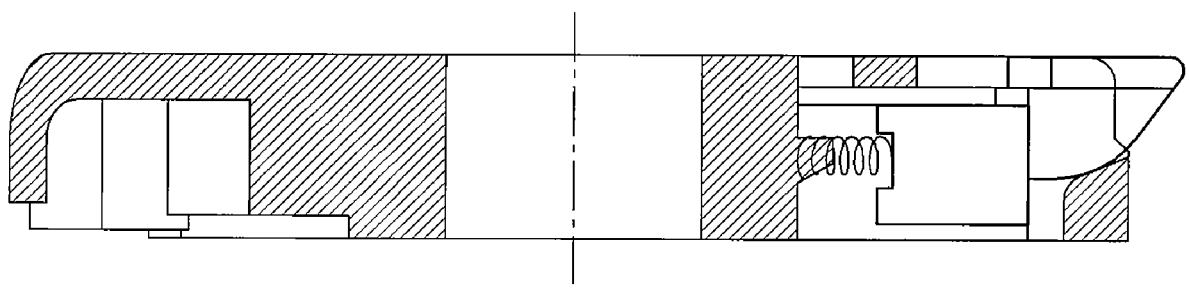
FIG. 1 is a cross-sectional view illustrating a disk chucking device in accordance with the related art.

As the invention allows for various changes and numerous embodiments, a particular embodiment will be illustrated in the drawings and described in detail in the written description. However, this is not intended to limit the present invention to a particular mode of practice, and it is to be appreciated that all changes, equivalents, and substitutes that do not depart from the spirit and technical scope of the present invention are encompassed in the present invention. In the description of the present invention, certain detailed descriptions of related art are omitted when it is deemed that they may unnecessarily obscure the essence of the invention.

The terms used in the present specification are merely used to describe a particular embodiment, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

A chuck pin and a disk chucking device having the chuck pin according to a certain embodiment of the present invention will be described below in more detail with reference to the accompanying drawings. Those components that are the same or are in correspondence are rendered the same reference numeral regardless of the figure number, and redundant descriptions are omitted.

Figure 2:
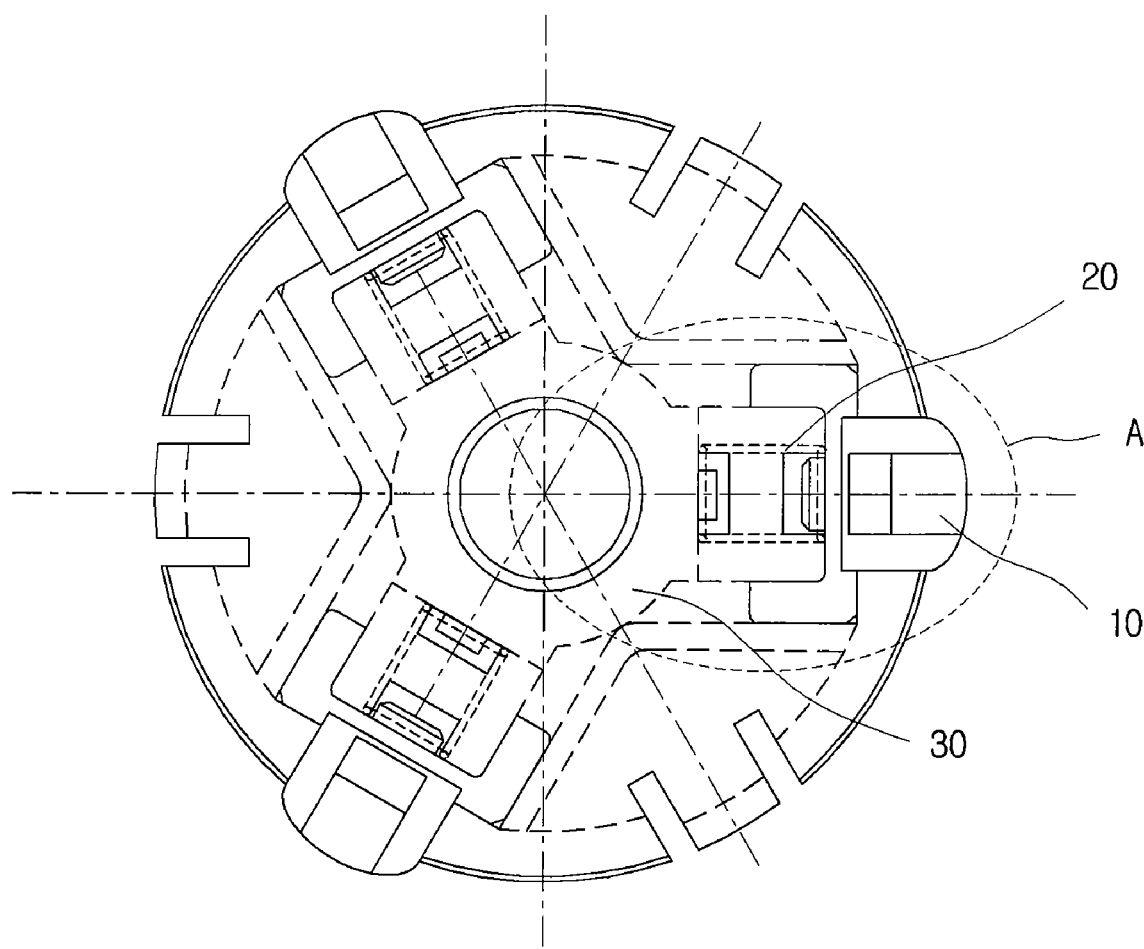
FIG. 2 is a plan view illustrating a disk chucking device in accordance with an embodiment of the present invention.
Figure 3:
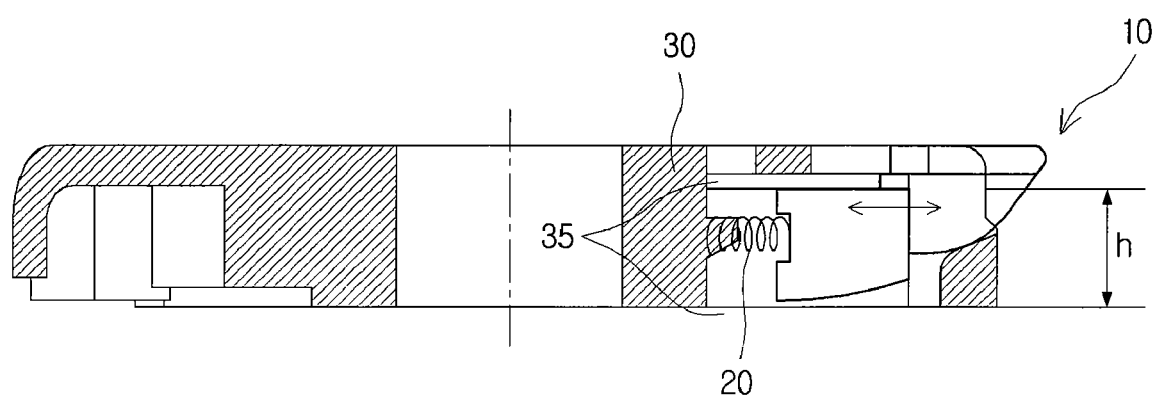
FIG. 3 is a cross-sectional view illustrating "A" of a disk chucking device in accordance with an embodiment of the present invention.
Figure 4:
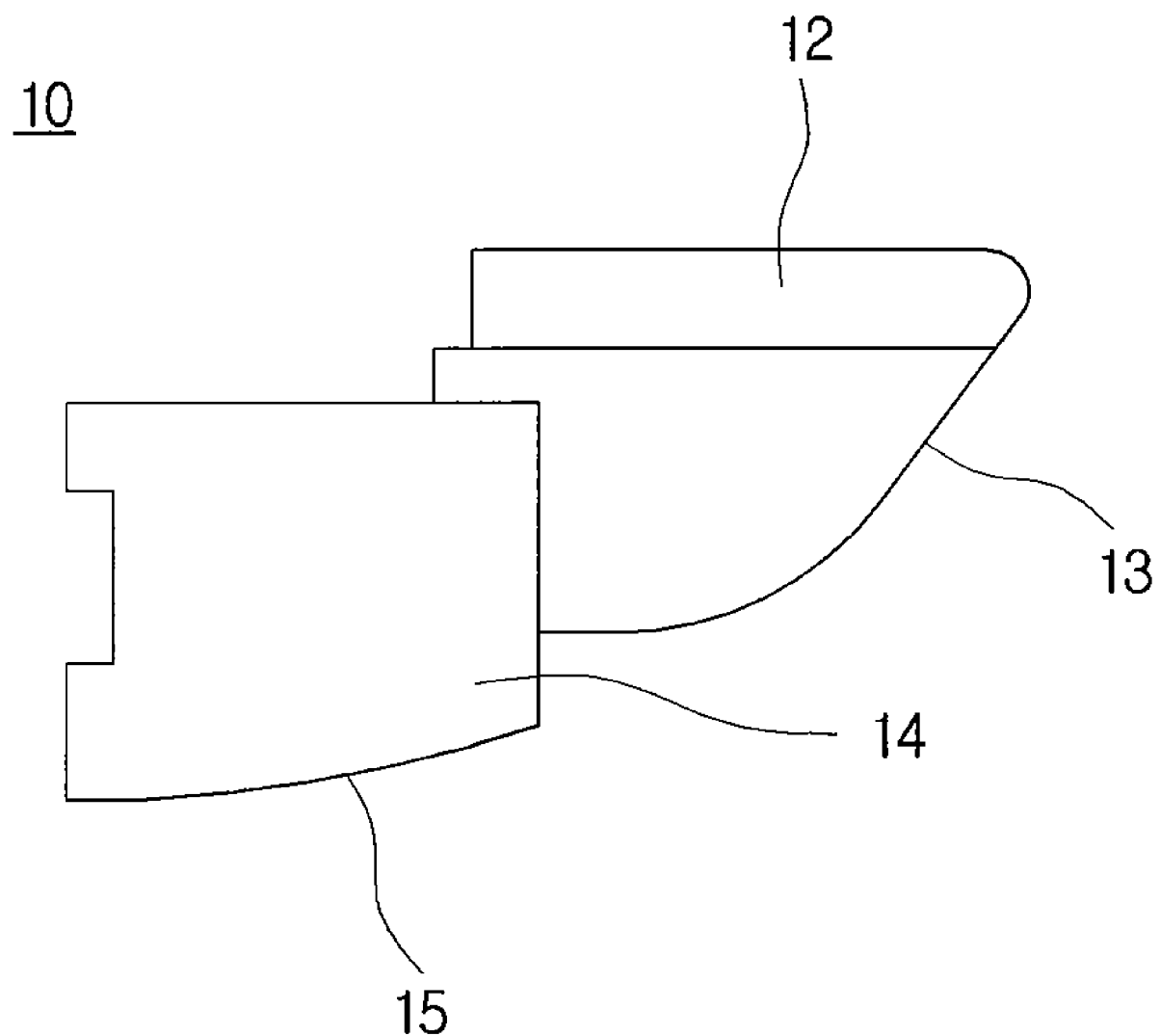
FIG. 4 is a cross-sectional view illustrating a chuck pin in accordance with an embodiment of the present invention.
Figure 5:
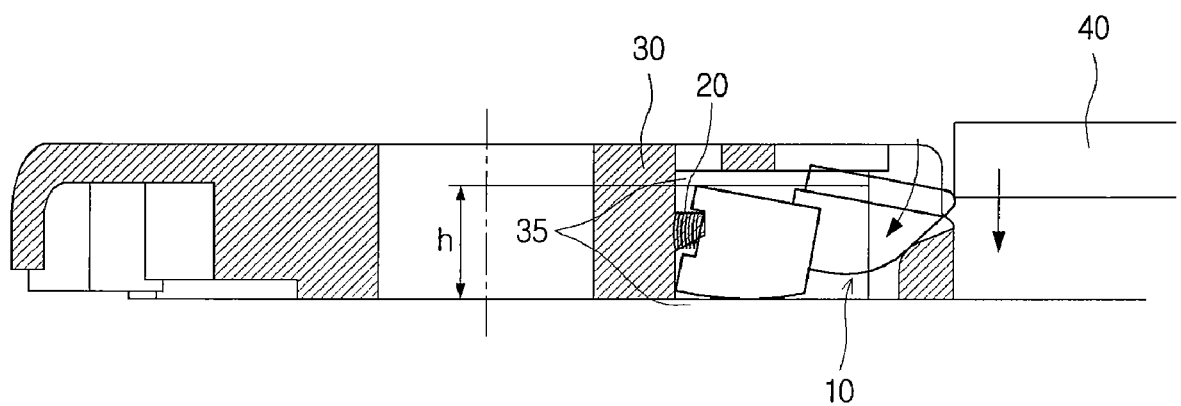
FIG. 5 is a cross-sectional view illustrating how a disk chucking device is operated in accordance with an embodiment of the present invention.

FIG. 2 is a plan view illustrating a disk chucking device in accordance with an embodiment of the present invention, and FIG. 3 is a cross-sectional view illustrating "A" of the disk chucking device in accordance with an embodiment of the present invention. Moreover, FIG. 4 is a cross-sectional view illustrating a chuck pin in accordance with an embodiment of the present invention, and FIG. 5 is a cross-sectional view illustrating how the disk chucking device is operated according to an embodiment of the present invention.

Illustrated in FIGS. 2 to 5 are a chuck pin 10, a protruding part 12, a body 14, an inclined part 15, an elastic body 20, a housing 30 and a guide part 35.

In accordance with an embodiment of the present invention, the chuck pin 10, which is for holding a disk 40 by pressing against an inner circumference of the disk 40, includes the protruding part 12, which presses the disk 40, and the body 14, of which a front part is coupled to the protruding part 12 and which has the inclined part 15 formed on a lower surface such that the front part can be rotated about a back part of the body 14 as a pivot when pressure is applied to an upper surface of the protruding part 12. Thus, when the disk 40 is loaded, the chuck pin 10 can be easily tilted downward.

The protruding part 12 functions to press the inner circumference of the disk 40, in order to fasten the loaded disk 40. To do this, referring to FIGS. 2 to 4, the protruding part 12 is protruded from the housing 30, which is inserted in a center hole formed in the disk 40. Moreover, in order to mount the loaded disk 40 in a lower area of the protruding part 12, a slope 13 is formed toward the housing 30 in a lower area of the protruding part 12.

The body 14 delivers a pressing force to the protruding part 12 while supporting the protruding part 12, such that the protruding part 12 can press the disk 40. Additionally, the body 14 is reciprocated inside the housing 30 such that the disk 40 can be loaded. To do this, referring to FIGS. 3 and 4, the front part of the body 14 is coupled to the protruding part 12, and the back part of the body 14 is supported by the elastic body 20.

Particularly, referring to FIG. 5, the inclined part 15 is formed on a lower surface of the body 14 such that the front part of the body 14 can be rotated about an back part of the body 14 as a pivot when pressure is applied to the upper surface of the protruding part 12 to load the disk 40. As a result, when the disk 40 is loaded, the chuck pin 10 can be easily tilted downward.

Here, as illustrated in FIG. 4, the inclined part 15 can be formed to incline downward from the front part to the back part of the body 14. Particularly, a curved surface can be formed on the inclined part 15, so that the chuck pin 10 can be tilted downward more easily.

This, however, is by no means to restrict the shape of the inclined part 15 to the shape described in the present embodiment, and it shall be appreciated that the present invention encompasses any shape that allows a back part of the chuck pin 10 to function as a pivot for inclination of the chuck pin 10 against a supporting surface and a front part of the chuck pin 10 to have a gap from the supporting surface.

In accordance with an embodiment of the present invention, the disk chucking device, which couples the disk 40 to a rotor of a motor such that the disk 40 can be mounted and demounted, includes: the housing 30, which accommodates a boss being coupled with the rotor; the chuck pin 10, which is inserted into the housing 30 such that the chuck pin 10 is protruded to the outside of the housing 30, presses the disk 40 and has the shape described earlier; and the elastic body 20, which is interposed between the chuck pin 10 and the boss of the housing 30 such that the chuck pin 10 is elastically supported toward the outside of the housing 30. With this configuration, the chuck pin 10 is kept from floating when the disk 40 rotates, and the chuck pin 10 can be easily tilted downward when the disk 40 is loaded.

Referring to FIG. 2, an outer circumference of the housing 30 is formed to correspond to the center hole of the disk 40 such that the housing 30 can be inserted in the center hole of the disk 40. Additionally, a plurality of holes are formed along the outer circumference of the housing 30 such that the chuck pin 10 can be inserted into the housing 30. The boss, which is coupled to the rotor, is formed in the center of the housing 30 such that the boss and the rotor can rotate together.

As described above, the lower surface of the chuck pin 10 has the inclined part 15. The chuck pin 10 is inserted into the plurality of holes formed on the outer circumference of the housing 30 and can be protruded from the housing to press the disk 40.

The elastic body 20 made of an elastic material and elastically supports the chuck pin 10 toward the outside of the housing 30 to transfer an elastic force, which presses the disk 40, to the chuck pin 10. For this, the elastic body 20 is interposed between the chuck pin 10 and the housing 30. In the present embodiment, a spring is used as the elastic body 20.

Referring to FIG. 5, in accordance with the disk chucking device based on the present embodiment, the chuck pin 10 has an inclined surface formed on its lower surface, and thus, when the disk 40 is loaded, the chuck pin 10 can be easily tilted downward and receded so that the disk 40 can be mounted easily.

Meanwhile, the guide part 35 is formed in the housing 30 to guide the reciprocating motion of the chuck pin 10. The height h of the guide part 35 is corresponds with the thickness of the back part of the body 14 to prevent the chuck pin 10 from floating.

In the conventional disk chucking device, it is required that a gap be provided between the chuck pin 10 and the housing 30 or the supporting surface, resulting in the effect of the disk 40 floating.

On the other hand, the disk chucking device in accordance with the present embodiment can minimize this gap. Since the chuck pin 10 based on the present embodiment has the inclined part 15, almost no gap is needed for tilting the chuck pin 10. Accordingly, it only requires the height h of the guide part 35 that is wide enough to allow the back part of the body 14 of the chuck pin 10 to move along the guide part 35. Thus, the gap between the chuck pin 10 and the housing 30 or the supporting surface can be minimized. Since there is almost no gap for the chuck pin 10 to be lifted, the effect of the chuck pin 10 floating is not resulted even if the chuck pin 10 is lifted from a lower to a higher position by the flotage of the disk 40. Therefore, the disk 40 can be prevented from being separated while the disk 40 rotates.

While the spirit of the invention has been described in detail with reference to a particular embodiment, the embodiment is for illustrative purposes only and shall not limit the invention. It is to be appreciated that those skilled in the art can change or modify the embodiment without departing from the scope and spirit of the invention. As such, many embodiments other than that set forth above can be found in the appended claims.

What is claimed is:

1. A chuck pin configured to fasten a disk by pressing an inner circumference of the disk, the chuck pin comprising:
   a protruding part configured to press against the disk; and
   a body including a front part longitudinally coupled to the protruding part, a back part having a recess, and an inclined part formed on a lower surface of the body such that the front part of the body is rotated about the back part of the body as a pivot when pressure is applied to an upper surface of the protruding part.

2. The chuck pin of claim 1, wherein the inclined part is formed to incline downward from the front part to the back part of the body.

3. The chuck pin of claim 1, wherein the inclined part comprises a curved surface.

4. A disk chucking device configured to couple a disk to a rotor of a motor such that the disk is mounted and demounted, the disk chucking device comprising:

a housing accommodating a boss being coupled with the rotor;

a chuck pin inserted into the housing such that the chuck pin is protruded from the housing, the chuck pin comprising a protruding part configured to press against the disk, and a body including a front part longitudinally coupled to the protruding part, a back part having a recess, and an inclined part formed on a lower surface of the body such that the front part of the body is rotated about the back part of the body as a pivot when pressure is applied to an upper surface of the protruding part; and an elastic body interposed between the chuck pin and the boss of the housing such that the chuck pin is elastically supported toward the outside of the housing.

5. The disk chucking device of claim 4, wherein the inclined part is formed to incline downward from the front part to the back part of the body.

6. The disk chucking device of claim 4, wherein a guide part is formed in the housing to guide a movement of the chuck pin, and a height of the guide part is formed in accordance with the thickness of the back part of the body.

* * * * *